Patented Oct. 21, 1924.

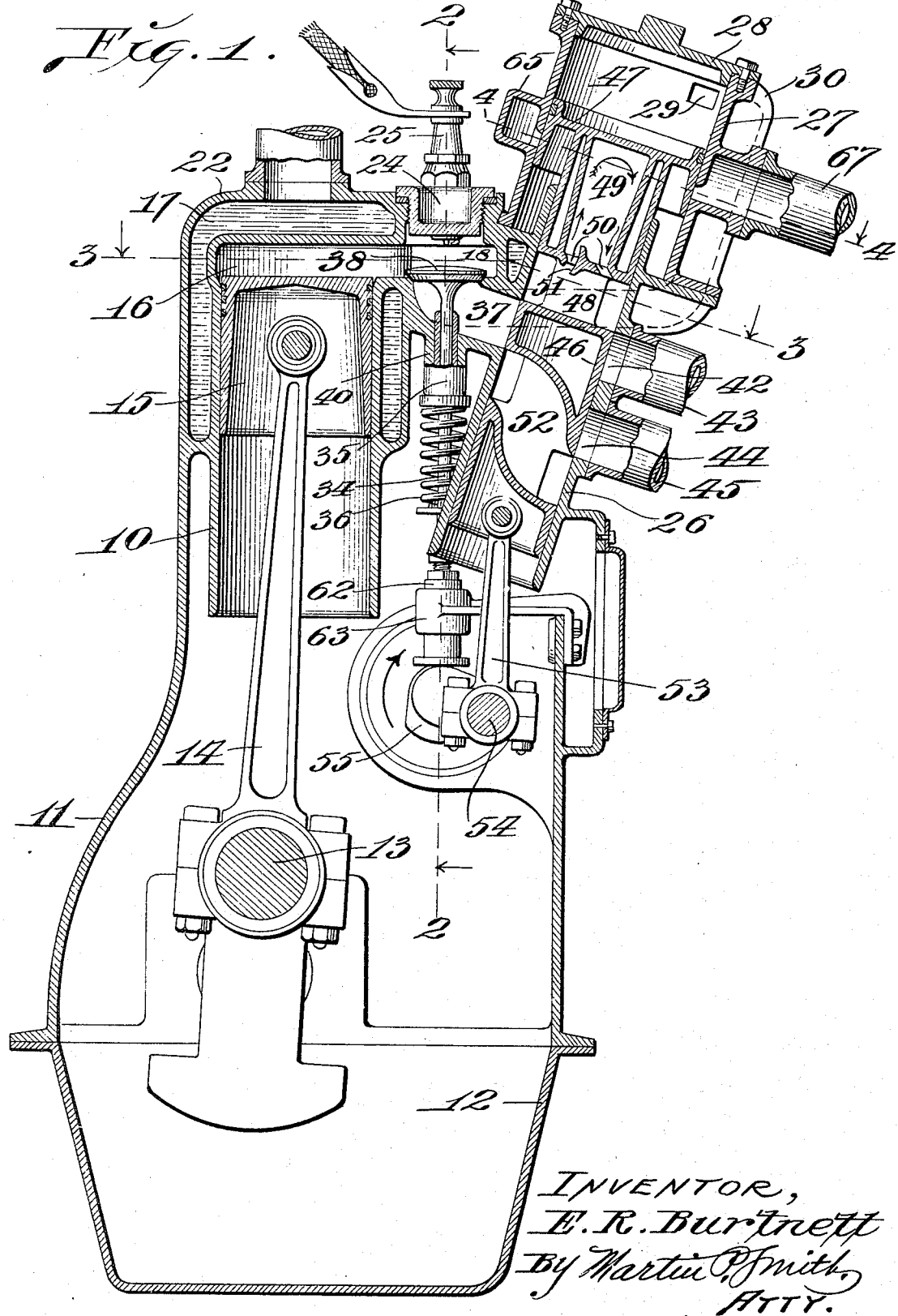

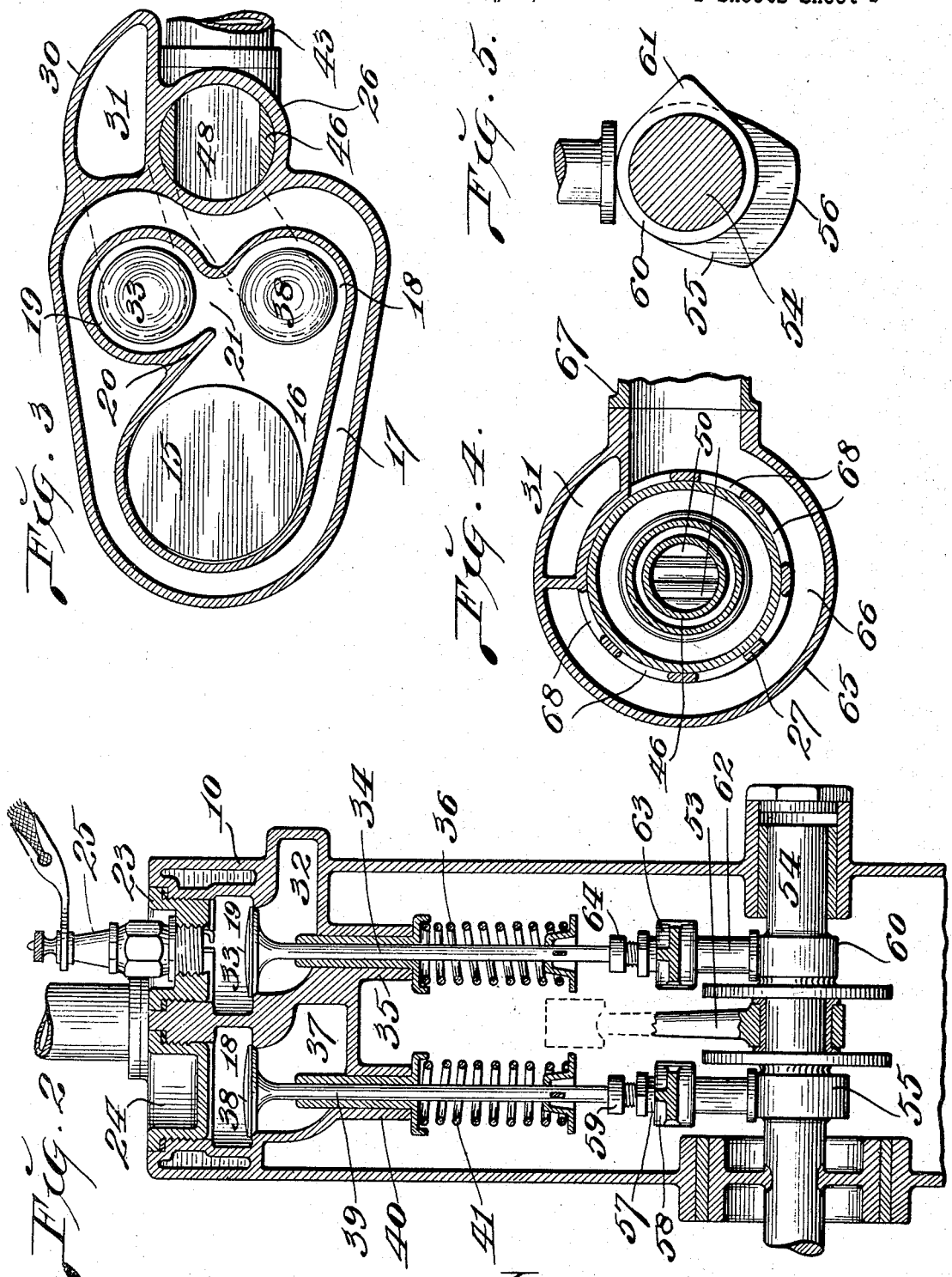

1,512,874

UNITED STATES PATENT OFFICE.

EVERETT R. BURTNETT, OF LOS ANGELES, CALIFORNIA, ASSIGNOR OF ONE-HALF TO CHARLES A. BURTNETT, OF LOS ANGELES, CALIFORNIA.

INTERNAL-COMBUSTION ENGINE.

Application filed July 6, 1922. Serial No. 573,102.

*To all whom it may concern:*

Be it known that I, EVERETT R. BURTNETT, a citizen of the United States, residing at Los Angeles, in the county of Los Angeles and State of California, have invented new and useful Improvements in Internal-Combustion Engines, of which the following is a specification.

My invention relates generally to internal combustion engines and more specifically to a constant inert volume, fuel mixture stratification engine.

The principal objects of my invention are, to provide an internal combustion engine of the four cycle principle having means for admitting to the combustion chamber, during the suction or admission stroke of the piston and through the same valve means that is utilized for the exhaust of the spent gases, an inert charge, either free air or cooled products of combustion and to provide means for supplying a variable proportion of pre-compressed gaseous fuel that enters the combustion chamber through an index valve during the latter portion and at the end of the inlet or suction stroke and which charge of gaseous fuel constitutes a volume that is additional to the inert piston displacement volume drawn into the combustion chamber during the suction stroke.

A further object of my invention is to provide an engine having a selector piston that functions to provide an alternating passage registration between the combined inert charge and exhaust valve, the inert charge manifold or means of inert charge supply, and the exhaust manifold or outlet pipe, said piston selector, by virtue of the construction of its upper portion, functioning as a supercharger or pre-compressor to the combustion chamber and providing a strangulation throttle control of the engine in connection with conventional or other means of volume control of the fuel mixture supply to the supercharger and at the same time maintaining constant inert charge volume to the combustion chamber.

A further object of my invention is to provide an engine and valve mechanism that permits the combustion chamber to be filled with an inert volume during the suction stroke of the piston and which inert charge enters the combustion chamber without variation or column movement restriction.

Further objects of my invention are to provide an engine governed by the proportion of fuel mixture super-supplied or forced into the cylinder under pressure after the cylinder has filled with an inert charge at atmospheric pressure, and to provide a relatively simple and practical structure in which the fuel mixture inducted to the cylinder under pressure, is maintained in separate or undiluted volume prior to its ignition, thereby providing a constant inert volume and fuel mixture stratification engine.

Further objects of my invention are to provide an engine wherein the exhaust valve is cooled by a constant volume of cool inert charge that enters the cylinder through or past said valve, such action taking place immediately succeeding each exhaust action and said exhaust valve being actuated by a two stroke duration cam, and further to provide an engine having two poppet type valves, one remaining open for the duration of the exhaust and inlet stroke so as provide an outlet for the hot spent gases and an inlet for the complete filling of the cylinder with inert air or products of combustion, and the other opening for any desired duration or time, but preferably during the latter portion of the inlet stroke in order to admit the required amount of gaseous fuel and which latter lies in a stratum on top of the inert volume of air or products of combustion.

With the foregoing and other objects in view my invention consists in certain novel features of combustion and arrangement of parts that will be hereinafter more fully described and claimed and illustrated in the accompanying drawings in which—

Figure 1 is a vertical section taken through the center of one of the cylinders of my improved engine;

Figure 2 is a vertical section taken approximately on the line 2—2 of Figure 1;

Figure 3 is a horizontal section taken on the line 3—3 of Figure 1;

Figure 4 is a horizontal section taken on the line 4—4 of Figure 1;

Figure 5 is a detail sectional view of the valve actuating cams, and showing their construction and relative positions.

Referring by numerals to the accompanying drawings which illustrate a practical embodiment of my invention, 10 designates a cylinder that may be formed integral with or fixed to the upper portion of a crank case member 11, and associated with the latter is a lower crank case member 12.

Suitable bearings are formed in the end walls of the crank case for a crank shaft 13, and connected to the latter in the usual manner is the lower end of a pitman 14, the upper end of which is connected in the usual manner to a piston 15 that is arranged for operation within the cylinder 10. The upper portion of the piston chamber within the cylinder constitutes a combustion chamber 16, and the wall of the upper portion of the cylinder is provided with a chamber 17 through which is adapted to circulate a fluid cooling medium, such as water.

Formed in the upper portion of cylinder 10 and communicating with the combustion chamber 16 is a substantially circular exhaust valve chamber 18 and a substantially circular gaseous fuel inlet chamber 19, and formed between the latter chamber and the combustion chamber 16 is an inwardly projecting deflecting wall 20, thereby forming a relatively narrow opening 21 between the gaseous fuel inlet chamber 19 and the exhaust chamber 18.

The top of cylinder 10 is closed by a suitable head 22, and removably positioned therein immediately above the inlet and exhaust chambers are plugs 23 and 24, respectively, which latter, when removed, render the inlet and exhaust valves readily accessible. Removably arranged in the plug 23 is a spark plug 25, the terminals of the electrodes of which are positioned in chamber 19.

Formed integral with or fixed to the cylinder 10 is a manifold selector valve housing 26, the axis of which is disposed at an angle relatively to the axis of the cylinder 10, said housing 26 being in the form of an open ended cylinder and arranged on the top thereof is a supercharging cylinder 27 closed at its upper end by a head 28.

Leading from a compressed gaseous fuel outlet port 29 in the upper portion of the cylinder 27 downwardly through a housing 30 that is formed on the side of cylinder 27, is a duct 31, the lower end of which communicates with a horizontally disposed duct 32 that is formed in the upper portion of cylinder 10, the inner end of said duct 32 communicating with the bottom of the inlet chamber 19.

An inlet valve 33 is arranged on a seat between the port 32 and chamber 19, said valve being arranged on the upper end of a stem 34, which latter is arranged for operation in a suitably located bearing 35, and associated with the lower portion of this valve stem is a spring 36 that acts to normally retain said valve upon its seat. Leading from the intermediate portion of the chamber within the cylinder 26 to the bottom of the exhaust chamber 18 is a duct 37, and arranged between the upper end of this duct and said exhaust chamber is an exhaust valve 38 that controls the exhaust of burnt products of combustion from the combustion chamber, and likewise the inlet of inert air or cooled products of combustion into the combustion chamber during the suction stroke of the piston. This valve is carried by the upper end of a stem 39 that is arranged for operation in a suitably located bearing 40, and associated with the lower portion of said valve stem is a spring 41 that acts to normally retain said valve upon its seat.

Formed through the outer portion of the wall of cylinder 26, and diametrically opposite to the lower end of duct 37, is an exhaust port 42 from which leads an exhaust pipe 43. Located in the outer portion of the wall of the cylinder 26 and a short distance below the outlet port 42 is an inlet port 44 for inert air or cooled products of combustion, which latter may be drawn from a suitably located container through a tubular connection, such as 45.

Arranged for reciprocatory movement within the cylinder 26 is a substantially cylindrical manifold selector 46 carrying at its upper end a piston 47 that is arranged for operation within the supercharging cylinder 27, and formed in the intermediate portion of this manifold selector is a diametrically arranged port or passageway 48, the ends of which are adapted to register with port 42 and the lower end of duct 37 to provide an outlet passageway for the exhaust products of combustion during the exhaust stroke of the piston.

Formed in the upper portion of the manifold selector is a chamber 49, the lower portion of which communicates with the port 48 through small openings 50, and formed adjacent to the outer edge of the inner one of these openings are deflector lips or flanges 51 that are designed to direct a portion of the products of combustion upwardly through the chamber 49 so as to raise the temperature thereof and consequently raise the temperature of the gaseous fuel charge that is pre-compressed within the supercharging cylinder 27.

Formed through the lower portion of the manifold selector cylinder is a duct 52, the upper end thereof occupying a substantially higher plane than the outer end, and the upper end of this duct is adapted to register with the lower end of duct 37 when the cylinder is at the upper end of its stroke, and at this time the lower end of said duct 52 is adapted to register with port 44. The lower portion of the manifold selector cylinder 46 is connected by a pitman 53 to the crank of a combined crank and cam shaft 54, the latter being journaled in suitable bearings in the upper portion of the crank case, said shaft being driven at half the speed of engine shaft 13. The driving connections from the shaft 13 to shaft 54 may be of any desired form, either gearing or a sprocket chain operating on sprocket wheels of suitable size.

Formed on this shaft 54 is a cam 55 having an eccentric or high portion 56 of such length as to retain the exhaust valve 38 open during two strokes of the piston of the engine, and bearing on the periphery of this cam is the lower end of a pin or plunger 57 that is mounted for vertical reciprocation in a suitably located bearing 58, the upper end of said pin or plunger carrying an adjustable member 59 that is engaged by the lower end of the stem 39.

Formed on the shaft 54 below the inlet valve stem 34 is a cam 60, having a relatively short high portion 61, and bearing on the surface of this cam is the lower end of a pin or plunger 62 that is journaled for reciprocatory movement in a suitable bearing 63. Adjustably seated in the upper end of this pin is a member 64 upon which bears the lower end of the inlet valve stem 34.

Formed integral with the intermediate portion of cylinder 27 is an annular housing 65 that encloses a duct 66, the latter extending partially around the cylinder 27, its inlet end being connected by a tubular member 67 to a suitable source of gaseous fuel supply, preferably a carburetor. Openings 68 are formed through the wall of cylinder 27 and establish communication between the duct 66 and the chamber within the supercharging cylinder.

The operation of my improved internal combustion engine is as follows:

With the parts in the positions illustrated in Figure 1, piston 15 is at its high center at the end of its compression stroke and a compressed stratified charge of fuel, inert air and products of combustion from the previously ignited charge is compressed within the chamber 16, and as the gaseous fuel was the last portion of the charge to enter the combustion chamber, said fuel completely fills the pocket or chamber 19 directly above the inlet valve 33.

As the piston passes its high center a spark is produced between the terminals of the electrode or plug 25, thereby igniting the compressed charge, and the force of the resulting ignition is directed on to the top of the piston 15 to move the same downwardly on its power stroke. As before stated, the combined crank and cam shaft 54 operates at half the speed of crank shaft 13, and said shaft 54 rotates in the direction indicated by the arrow in Figure 1.

Owing to the arrangement of the crank of shaft 54 relative to the position of crank 13, the manifold selector 46 is moving through the latter half of its downward travel while the piston 15 is moving downwardly on its power stroke, and when said piston reaches its low center, immediately succeeding its power stroke crank shaft 54 passes its low center, at which time port 48 is in full registration with port 42 and duct 37. At this point the lower end of plunger 57 is engaged by the high portion 56 of cam 55, so that stem 39 is elevated to unseat exhaust valve 38, and on the succeeding upward stroke of piston 15 and while port 48 is gradually moving upward with respect to port 42 and duct 37, the products of combustion within the combustion chamber are being forced out through chamber 18, past open exhaust valve 39 through duct 37, ports 48 and 42 and through exhaust pipe 43.

As the burnt gases and products of combustion are thus forced through port 48 a small amount of said burnt gases will be deflected upwardly by the lower one of the lips 51 so that a certain amount of said burnt gases will circulate through chamber 49, thereby heating the latter and through radiation heating the supercharging cylinder 27. As piston 15 reaches its high center subsequent to its exhaust stroke the lower edge of port 48 passes out of registration with the upper edges of port 42 and duct 37 and immediately the upper edge of the upper end of duct 52 registers with and passes the lower edge of duct 37 and simultaneously the upper edge of the lower end of duct 52 registers with and passes the lower edge of port 44.

During this action, and while piston 15 is moving downward through the greater portion of its suction stroke exhaust valve 38 is held open by the high portion 56 of cam 55 and while duct 52 is in registration with port 44 and duct 37 a volume of inert air or cooled products of combustion from a suitable container will be drawn through tube 45, port 44, duct 52, duct 37, past open check valve 38 into chamber 18, and this volume of inert air will force the products of combustion remaining in the combustion chamber 16 downwardly through the piston clearance within cylinder 10 so that following such action a stratum of products of combustion will lie immediately against the head of the piston 15. Overlying this stratum of products of combustion is a stratum of inert air or cooled products of combustion. As piston 47 on the upper end of the manifold selector 46 is drawn downwardly to its limit of movement, ports 68 are uncovered and the partial vacuum established within the chamber in cylinder 27 will cause said chamber to draw gaseous fuel from the source of supply through pipe 67, through duct 66 and through said open inlet ports 68. On the succeeding upward stroke of piston 47, this charge of gaseous fuel will be compressed in the upper portion of the chamber within the cylinder 27 and within the ducts 31 and 32. Prior to the time the piston 15 reaches its low center on its suction stroke the point 61 of cam 60 engages pin or plunger 62, thereby lifting the same and in turn lifting inlet valve 33 from its seat so that as the piston 15 approaches and reaches its low center immediately following its suction stroke the pre-compressed charge of gaseous fuel will enter chamber 19 and pass through the relatively narrow opening 21, across the exhaust valve 38 and fill chamber 18 and likewise the combustion chamber 16.

Thus at the completion of the suction stroke of the piston, a stratum of gaseous fuel occupies the chambers 19, 18 and 16 and a portion of such stratum overlying the stratum of inert air, which latter in turn overlies the stratum of burnt products of combustion. Immediately following this action, inlet valve 33 closes and on the following upward stroke of piston 15 the stratified volume will be compressed within the chambers 16, 18 and 19 and as the piston passes its high center the gaseous fuel portion of the compressed charge will be ignited in the usual manner by a spark produced between the terminals of the electrodes of plug 25.

Thus it will be seen that I have provided means for pre-compressing and supercharging gaseous fuel into the combustion chamber subsequent to the admission of a volume of inert air or cooled products of combustion, the latter being admitted directly on top of a relatively small volume of products of combustion that remains in the combustion chamber after the previous ignition of the combustible charge, which arrangement provides a constant inert volume and fuel mixture stratification engine.

My improved engine is relatively simple in construction, comprises a minimum number of operating parts that may be readily assembled or taken apart, may be operated economically from the standpoint of fuel consumption and may be advantageously employed wherever high speed rotary motion and power are desired.

It will be understood that minor changes in the size, form and construction of the various parts of my improved engine may be made and substituted for those herein shown and described without departing from the spirit of my invention, the scope of which is set forth in the appended claims.

I claim as my invention:

1. An internal combustion engine having inlet and exhaust poppet valves, means for holding the exhaust valve open during two strokes of the piston of the engine, and means for admitting inert air past the open exhaust valve during one of the strokes of the piston of the engine.

2. An internal combustion engine having inlet and exhaust poppet valves, means for holding the exhaust valve open during two strokes of the piston of the engine, means for admitting inert air past the open exhaust valve during one of the strokes of the piston of the engine, and means for opening the inlet valve to admit gaseous fuel during the same stroke of the piston of the engine.

3. An internal combustion engine having inlet and exhaust poppet valves, means for holding the exhaust valve open during two strokes of the piston of the engine to permit the exhaust of burnt products of combustion from the combustion chamber and to admit to said combustion chamber a volume of inert air or cooled products of combustion, and means for holding the inlet valve open during the admission of a pre-compressed charge of gaseous fuel on top of the volume of inert air taken into the combustion chamber of the engine.

4. An internal combustion engine having inlet and exhaust poppet valves, a manifold selector co-operating with said valves for controlling the exhaust of burnt products of combustion from said engine and the admission of inert air into the combustion chamber of the engine, a supercharging cylinder enclosing one end of said manifold selector and a piston carried by said manifold selector and arranged for operation within said supercharging cylinder.

5. The combination with an internal combustion engine, of a manifold selector arranged for operation in proper time relation to the movements of the piston of the engine for controlling the exhaust of burnt products of combustion from the engine for the admission of inert air to the combustion chamber of the engine on top of the stratum of products of combustion remaining in the combustion chamber subsequent to the exhaust stroke of the piston, and means associated with said manifold selector for effecting operation of a charge of gaseous fuel, which latter is inducted into the combustion chamber of the engine subsequent to the admission of the volume of inert air into the combustion chamber in said engine.

6. In an internal combustion engine, a manifold selector having a gaseous fuel compression piston at one end, there being a products of combustion circulation chamber formed in said manifold selector adjacent to said piston.

7. In an internal combustion engine having a combustion chamber, means including a manifold selector and an exhaust valve for permitting the exhaust of burnt products of combustion from the combustion chamber and for admitting inert air or cooled products of combustion into said combustion chamber, and means including said manifold selector and an inlet valve for admitting a charge of gaseous fuel into the combustion chamber on top of the inert air within said combustion chamber.

8. In an internal combustion engine having a combustion chamber, means including a manifold selector and an exhaust valve for permitting the exhaust of burnt products of combustion from the combustion chamber and for admitting inert air or cooled products of combustion into said combustion chamber, means including said manifold selector and an inlet valve for admitting a charge of gaseous fuel into the combustion chamber on top of the inert air within said combustion chamber, and means associated with said manifold selector for pre-compressing the charge of gaseous fuel admitted to said combustion chamber.

9. The combination with an internal combustion engine having the usual combustion chamber and piston, of a selector piston arranged to operate at half the speed of the engine, and said piston being provided with ports that are adapted to alternately register with the exhaust port on the engine, and means associated with said selector piston for pre-compressing gaseous fuel charges and forcing the same under pressure into the combustion chamber of the engine.

10. An internal combustion engine having a combustion chamber, inlet and exhaust valve chambers, a selector chamber and a fuel supercharging chamber, said selector chamber and supercharging chambers being in communication with the combustion chamber, poppet valves for controlling communication between said selector chamber, said supercharging chamber and said combustion chamber, a selector piston arranged for reciprocatory movement within said selector chamber, and a piston carried by said selector piston and arranged for operation within the supercharging chamber.

11. An internal combustion engine provided with a combustion chamber and with inlet and exhaust valve chambers, a poppet valve controlling the passage of products of combustion and inert air through the exhaust chamber, a poppet valve for controlling the admission of gaseous fuel to the inlet valve chamber, and a selector piston arranged for operation at half the engine speed and co-operating with said inlet and exhaust valves.

12. An internal combustion engine provided with a combustion chamber and with inlet and exhaust valve chambers, a poppet valve controlling the passage of products of combustion and inert air through the exhaust chamber, a poppet valve for controlling the admission of gaseous fuel to the inlet valve chamber, a selector piston arranged for operation at half the engine speed and co-operating with said inlet and exhaust valves, and means co-operating with said selector piston for compressing the charges of gaseous fuel with air admitted to the combustion chamber past the gaseous fuel inlet valve.

13. In an internal combustion engine, an inlet valve, an exhaust valve and a selector piston, which valves and selector piston co-operate to control the exhaust of burnt products of combustion from the combustion chamber of said engine, the admission of inert air into said combustion chamber and the admission of gaseous fuel charges into said combustion chamber, and a combined crank and cam shaft for operating said inlet and exhaust valves and selector piston.

14. In an internal combustion engine, an inlet valve, an exhaust valve and a selector piston, which valves and selector piston co-operate to control the exhaust of burnt products of combustion from the combustion chamber of said engine, the admission of inert air into said combustion chamber and the admission of gaseous fuel charges into said combustion chamber, a combined crank and cam shaft for operating said inlet and exhaust valves and selector piston, and means for operating said combined cam and crank shaft at half the speed of the engine shaft.

In testimony whereof I have signed my name to this specification.

EVERETT R. BURTNETT.